J. A. CUNNINGHAM.
NAIL.
APPLICATION FILED MAR. 31, 1909.
970,423.
Patented Sept. 13, 1910.
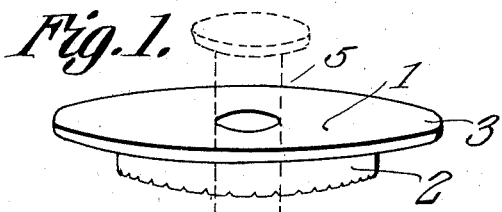
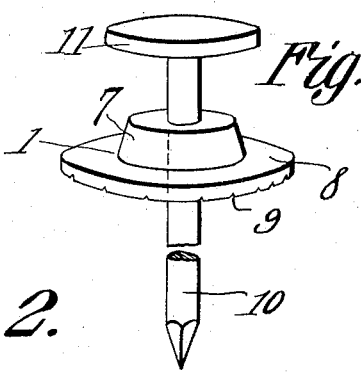
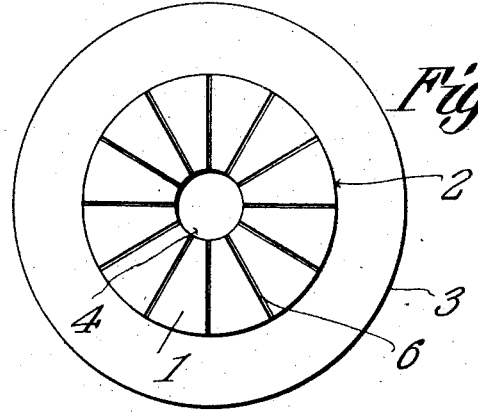
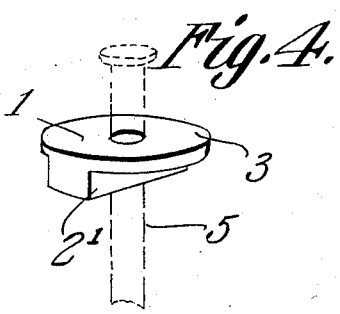
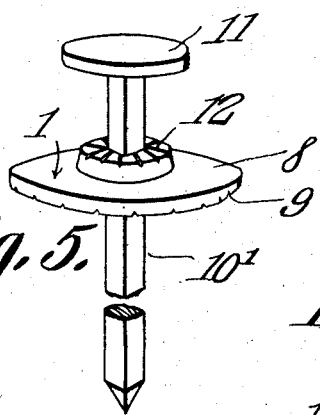
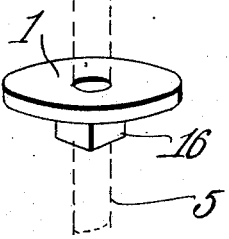
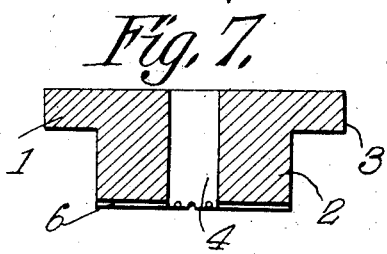
Witnesses
Inventor
John A. Cunningham
By C. A. Snow & Co.
Attorneys
THE NORRIS PETERS CO., WASHINGTON, D. C.

UNITED STATES PATENT OFFICE.

JOHN A. CUNNINGHAM, OF SOUTH BETHLEHEM, PENNSYLVANIA.

NAIL.

970,423.  Specification of Letters Patent.  Patented Sept. 13, 1910.

Application filed March 31, 1909.  Serial No. 486,972.

*To all whom it may concern:*

Be it known that I, JOHN A. CUNNINGHAM, a citizen of the United States, residing at South Bethlehem, in the county of Northampton and State of Pennsylvania, have invented a new and useful Nail, of which the following is a specification.

This invention has reference to improvements in nails designed for securing two or more articles together, such for instance as the securing of two boards together, and its object is to provide a means whereby a nail may be readily withdrawn from its fastening position.

The invention also comprises a member usable in connection with an ordinary or common nail for rendering the same readily withdrawable and at the same time adding to the holding qualities of the nail.

The invention will be best understood from a consideration of the following detail description taken in connection with the accompanying drawings forming a part of this specification, in which drawings, Figure 1 is a perspective view of a member embodying the invention and designed to be used in connection with an ordinary nail, the showing being on an enlarged scale. Fig. 2 is a bottom plan view of the showing of Fig. 1. Fig. 3 is a perspective view illustrating the adaptation of the structure of Fig. 1 as a removable member used in connection with a special form of nail. Fig. 4 is a modified form of the structure of Fig. 1. Fig. 5 is a modified form of the structure shown in Fig. 3. Fig. 6 is a modified form of the structure of Fig. 1. Fig. 7 is a diametric section through the structure shown in Fig. 1.

Referring first to Fig. 1 there is shown a disk-shaped or washer-like structure 1, thickened on one face to form a central boss beyond which latter the body portion extends as an annular flange 3 so that when the face of the boss 2 remote from the flange 3 is resting upon a surface there is provided a space between such surface exterior to the boss 2 and the under surface of the flange 3. Formed centrally through the body portion 1 and through the boss 2 is a hole or passage 4 of such size as to freely receive a nail indicated in dotted lines at 5.

In the structures shown in Figs. 1, 2 and 7 the washer-like structure is adapted for use in connection with ordinary wire nails but may also be used with cut nails of proper size.

To cause a firm engagement between the free face of the boss 2 and the surface against which the nail forces the said boss 2, such free face may be roughened or grooved as indicated at 6.

When a nail is driven into any substance, say a board, in order to fasten the same to another board, the washer 1 is interposed between the head of the nail and the board and the flange 3 thereby constitutes an overhang between the head of the nail and the board. Ordinarily when a nail is driven into a board the head of the nail is brought down to the surface of the board and usually is sunk more or less into the board, so that it is impossible to withdraw the nail with an ordinary claw hammer, or with a special claw tool and the nail can only be withdrawn by the use of a special nail puller having jaws which are forced into the wood, or the boards must be forced apart at their meeting faces with the result that often times the nails pull through the board with which the head is in engagement and remain in the other board to be withdrawn afterward. Whatever be the means employed for withdrawing the nails, the attempt to separate the two members fastened together by the nail results in the marring and breaking away of a portion of the surface of the board where the head of the nail engages the same. With the present invention the washer 1 becomes a supplemental head preventing the ordinary head of the nail from entering the wood and providing a means readily engaged by the claw tool whether the latter be a special tool or the claw of a hammer, and the surface of the board is in no wise damaged further than the smooth and small hole caused by the passage of the shank of the nail through the board.

The present invention is designed more particularly for use in connection with nailed structures intended to be dismantled after short use and where it is desired to use the boards again and again for the same purpose or for other purposes. The supplemental washer is particularly useful in connection with nailed structures such as scaffolds and the like where the nailed-up structure is of a temporary nature and so the boards used may be repeatedly employed without marring and by driving the nails through the same holes again and again.

In Fig. 4 the structure is somewhat modified by making the boss elongated or of the same extent as the flange along a diameter of the flange as indicated at 2' so that the flange overhangs the elongated boss 2' on opposite sides of a diameter only. This is ample for the introduction of a claw tool for the withdrawing of the nail.

In Fig. 3 the washer is designed to be used in a position the reverse of that shown in Fig. 1 and a special nail is designed to be used in connection with the structure of the washer shown in this figure. In this last named figure the boss is indicated at 7 and may be frusto-conical as shown. The flange produced by the radial extension of the washer beyond the boss is indicated at 8 and the outer face of the washer is roughened or grooved as indicated at 9, this face being the one designed to engage the wood. The nail is indicated at 10 and may have a shank similar to the ordinary wire nail while the head 11 of the nail is expanded laterally until its diameter is greater than that of the boss 7 so as to overhang the latter. When such a nail is used in connection with the washer the under face of the head 11 engages the outer face of the boss 7 and the grooved or roughened face 9 of the washer is forced into engagement with the wood. To withdraw such a nail it is only necessary to introduce the claw under the head 11, this head overhanging the boss 7 so as to leave ample room for the claw tool. The broad expanse of the flange 8 prevents any injury to the wood into which the nail is driven further than the small hole due to the entrance of the shank 10 into the wood.

The structure shown in Fig. 5 differs from that of Fig. 3 in that the boss 7 is provided on the upper or free face with corrugations 12, which corrugations are to be taken as indicative of any suitable roughening of its surface. The nail differs somewhat from that shown in Fig. 3 in having a square shank 10', while the hole through the washer is likewise square to accommodate the square shank 10'. The washer of Fig. 5 whether provided with a square or round hole through it may be used either side up so that it is adapted to be used in connection with a nail such as shown in Figs. 3 and 5 or with a common nail such as indicated in Figs. 1 and 4.

In Fig. 6 the boss is square instead of cylindrical as indicated in Fig. 1. This square boss is designated by the reference numeral 16. The structure of Fig. 6 may be used in connection with an ordinary wire nail.

By making the washer with a central reinforcing boss, so that at this point the washer is thicker in metal than at the edges, it will resist distorting action of the nail drawing tool.

What is claimed is:—

1. A device for use in connection with nails comprising a washer having one face thickened to constitute a boss, beyond which the washer extends to form a flange, said washer having an axial passage therethrough of substantially equal diameter throughout and extending from the outer face of the flanged end of the washer to the outer face of the boss.

2. The combination with a nail having a laterally extended head, of a flat washer having a boss on one face and provided with a central perforation for the passage of a nail, the boss being adapted to be engaged by the nail head and having a smaller superficial area than the corresponding face of the nail head.

In testimony that I claim the foregoing as my own, I have hereto affixed my signature in the presence of two witnesses.

JOHN A. CUNNINGHAM.

Witnesses:
MIKE TALBOT,
JOSEPH H. McGEE.